Patented Aug. 2, 1932

1,869,638

UNITED STATES PATENT OFFICE

RAYMOND M. WARNER, OF BARBERTON, OHIO, ASSIGNOR, BY MESNE ASSIGNMENTS, TO THE MILLER RUBBER COMPANY INC., OF WILMINGTON, DELAWARE, A CORPORATION OF DELAWARE

RUBBER CEMENT AND PROCESS OF PRODUCING THE SAME

No Drawing. Original application filed May 29, 1928, Serial No. 281,588. Divided and this application filed April 20, 1929. Serial No. 356,891.

This invention relates to a rubber cement and process for producing the same for forming a permanent bond between rubber and metals or analogous surfaces.

An object of the invention is to produce an effective adhesive for this purpose having stable qualities for effecting a union between rubber, metal, glass, wood, or other material, which union will last indefinitely without deterioration of the adhesive character of the bonding cement.

A further object is to produce a cement which can be applied to a metal surface such as iron and thereafter a layer of raw rubber compounded with the proper ingredients for vulcanization may be applied and vulcanized, the cement never curing but remaining adhesive to effect the bond.

Other objects will appear hereinafter.

The invention consists in making rubber cement, adapted to be used in uniting layers of rubber to surfaces of metal and other materials and specially adapted for use in the lining of metal tanks and drums with rubber, though it may also be used for cementing rubber lining to wooden tanks and tanks of other materials.

The rubber cement is made by treating dissolved rubber with one of the halogen elements.

The rubber is put into a solution in one of the well known rubber solvents such as benzol, toluol, or xylol, and bromine being found to be the most desirable halogen element for this use, is dissolved in a similar solvent and the dissolved rubber and halogen are mixed together and stirred until a homogeneous cement is produced.

It is found that where too much bromine is introduced the rubber material has a tendency to coagulate and separate from the solvent and to make the cement difficult to spread, whereas, if too small an amount of bromine is used, the cement does not develop the proper adhesive properties to permanently unite the rubber to the metal or other surfaces.

Experiment has shown that using 136 grams of crude rubber and from 40 to 80 grams of bromine, will make a successful cement, which is only partly brominated and which will keep in a stable condition of adhesiveness for a long time.

In its use as an adhesive to bond rubber to metal or other material, the partially brominated rubber cement is not cured and remains adhesive.

Other halogen elements may be used in place of bromine, which however, produces a superior cement and is preferable for this purpose. Iodine is more active than bromine and can be used but is not as controllable as the bromine. Successful results have been obtained by the use of chlorine equal to those resulting from the use of bromine but chlorine occurring only as a gas at ordinary temperatures and pressures, it is more difficult to prepare the cement as it is necessary to add the chlorine by piping the gas through the dissolved rubber.

Brominated cement or chlorinated cement prepared as above set forth will produce a very firm and durable joint between a layer of iron and a layer of rubber, of which rubber cements heretofore used are not capable.

This application is a division of my co-pending application, Ser. No. 281,588, filed May 29, 1928.

I claim:

1. A rubber cement comprising partially brominated rubber.

2. A rubber cement consisting of dissolved rubber partially brominated.

3. The process of making rubber cement comprising dissolving rubber in a well known rubber solvent, dissolving bromine in a similar solvent, mixing the dissolved rubber and bromine, and stirring until a homogeneous cement is produced.

4. The process of making partially brominated rubber cement comprising dissolving crude rubber in a well known rubber solvent, dissolving bromine in a similar solvent, mixing the dissolved rubber and bromine, and stirring until a homogeneous cement is produced.

5. The process of making partially brominated rubber cement comprising treating about 136 parts by weight of crude rubber dissolved in a suitable rubber solvent, with from 40 to 80 parts by weight of bromines dissolved in a similar solvent.

6. A rubber cement consisting of dissolved rubber less than half saturated with bromine.

7. A rubber cement consisting of a solution of rubber reacted with a proportion of bromine from one-eighth to one-fourth that required for complete saturation.

In testimony whereof, I affix my signature.

RAYMOND M. WARNER.

CERTIFICATE OF CORRECTION.

Patent No. 1,869,638.  August 2, 1932.

RAYMOND M. WARNER.

It is hereby certified that the name of the assignee in the above numbered patent was erroneously described and specified as "The Miller Rubber Company Inc.," whereas said name should have been described and specified as "Miller Rubber Company, Inc.," as shown by the records of assignments in this office; and that the said Letters Patent should be read with this correction therein that the same may conform to the record of the case in the Patent Office.

Signed and sealed this 23rd day of May, A. D. 1933.

M. J. Moore,

Acting Commissioner of Patents.

(Seal)

from 40 to 80 parts by weight of bromines dissolved in a similar solvent.

6. A rubber cement consisting of dissolved rubber less than half saturated with bromine.

7. A rubber cement consisting of a solution of rubber reacted with a proportion of bromine from one-eighth to one-fourth that required for complete saturation.

In testimony whereof, I affix my signature.

RAYMOND M. WARNER.

CERTIFICATE OF CORRECTION.

Patent No. 1,869,638.        August 2, 1932.

RAYMOND M. WARNER.

It is hereby certified that the name of the assignee in the above numbered patent was erroneously described and specified as "The Miller Rubber Company Inc.," whereas said name should have been described and specified as "Miller Rubber Company, Inc.," as shown by the records of assignments in this office; and that the said Letters Patent should be read with this correction therein that the same may conform to the record of the case in the Patent Office.

Signed and sealed this 23rd day of May, A. D. 1933.

M. J. Moore,

Acting Commissioner of Patents.

(Seal)

CERTIFICATE OF CORRECTION.

Patent No. 1,869,638.                                                   August 2, 1932.

RAYMOND M. WARNER.

It is hereby certified that the name of the assignee in the above numbered patent was erroneously described and specified as "The Miller Rubber Company Inc.," whereas said name should have been described and specified as "Miller Rubber Company, Inc.," as shown by the records of assignments in this office; and that the said Letters Patent should be read with this correction therein that the same may conform to the record of the case in the Patent Office.

Signed and sealed this 23rd day of May, A. D. 1933.

M. J. Moore, (Seal)                                         Acting Commissioner of Patents.